United States Patent [19]

Dowden

[11] 4,197,430
[45] Apr. 8, 1980

[54] OPERATOR SERVICE POSITION SYSTEM

[75] Inventor: Douglas C. Dowden, Naperville, Ill.

[73] Assignee: Bell Telephone Laboratories, Incorporated, Murray Hill, N.J.

[21] Appl. No.: 942,554

[22] Filed: Sep. 15, 1978

[51] Int. Cl.² .............................................. H04Q 3/64
[52] U.S. Cl. ................................................. 179/27 D
[58] Field of Search ....................... 179/27 D, 175.2 C

[56] References Cited

U.S. PATENT DOCUMENTS 4,145,578  3/1979  Orriss ................................. 179/27 D Primary Examiner—Thomas W. Brown
Attorney, Agent, or Firm—Kenneth H. Samples

[57] ABSTRACT

An arrangement and method for providing operator services to a plurality of subscribers wherein each subscriber is associated with one of a plurality of service acceptability times is disclosed. Service requests from the subscribers are stored when they are received by the arrangement and served in a predetermined order. Also, a record is maintained of the number of subscribers served. The time that each service request is held in the store waiting for service is then computed and compared with the service acceptability time associated with the service request and a count is maintained of the total number of requests that are not served within their associated service acceptability times. When the number of service requests not served within their associated service acceptability time exceeds a predetermined relationship to the total number of subscribers served, the number of service requests stored in the system is reduced. This reduction is implemented by inhibiting the storage of new requests and/or by initiating more rapid service of the requests to the system.

7 Claims, 5 Drawing Figures

OPERATOR SERVICE POSITION SYSTEM

This invention relates to telephone systems for providing operator services, and more particularly, to such systems which maintain a list of the identities of subscribers waiting for service.

Increased automation is the trend in the telecommunications industry; however, certain types of calls, e.g., person-to-person calls, still require that special service be given by an operator. In order to take maximum advantage of the call servicing time provided by a group of operators, some systems have the capability of maintaining a list, called a queue herein, of the identities of subscribers waiting for service. When an operator becomes available, a subscriber's identity is selected from the queue and the subscriber so identified is served by the operator. Typically, all waiting subscribers are given an audible ring tone to let them know that they will be served.

BACKGROUND OF THE INVENTION

Studies indicate that subscribers are dissatisfied with service when their service requests remain in the queue for too long before they are served. One prior art arrangement for alleviating this problem is to limit the number of subscribers waiting by not entering new identities into the queue, when the number of entries in the queue exceeds a predetermined value. This predetermined value is based on the number of operators presently serving requests and an assumed average rate of service per operator. Whenever the assumed average rate of service differs from the actual rate, the above arrangement incorrectly estimates subscriber delay resulting in inappropriate maximum queue lengths. Additionally, some operator service systems service different types of subscribers having different service acceptability times, i.e., different time delays before service is considered unsatisfactory. No provision is made in the above-mentioned prior art arrangement for accurately determining the maximum queue length when different subscriber types having different service acceptability times are allowed to use the system.

It is a feature in the present invention to control the average time delay of subscribers waiting for service based upon a continuously measured indicator of past service acceptability in such a manner that an accurate maximum queue length can be determined when different subscriber types having different service acceptability times utilize the system.

SUMMARY OF THE INVENTION

A system for providing operator services to a plurality of subscribers, each of which is associated with one of a plurality of service acceptability times in accordance with the present invention, includes an arrangement for storing service requests from subscribers before they are served. The method of limiting the number of stored service requests comprises servicing the requests in a predetermined order and counting each subscriber served at the time of service, the elapsed time that the service request was stored before being served is compared with the service acceptability time for that particular subscriber, and a determination of deficient service is made when the elapsed storage exceeds the service acceptability time of that subscriber. The method continues by counting the total number of subscribers receiving deficient service and by reducing the number of service requests stored when the number of subscribers receiving deficient service exceeds a predetermined relationship to the total number of subscribers served.

BRIEF DESCRIPTION OF THE DRAWING

The present embodiment would be more readily understood from the following description when read in conjunction with the drawing wherein:

FIG. 1 is a block diagram of a Traffic Service Position System (TSPS) used to provide operator assistance to telephone system subscribers. The TSPS includes a TSPS center 100 comprising a number of operator positions, 109-1 through 109-n, interposed between a local telephone office 101 and a toll office 102. Also shown connected to TSPS center 100, is a Centralized Automatic Message Accounting (CAMA) office 140. A switching network 104 is used to connect incoming trunks from the local and CAMA offices to the circuits required to provide the necessary assistance. Such circuits include tone and service circuits 108, digit receivers 107, announcement circuits 110, and the previously mentioned operator positions 109-1 through 109-n.

Figure 1:
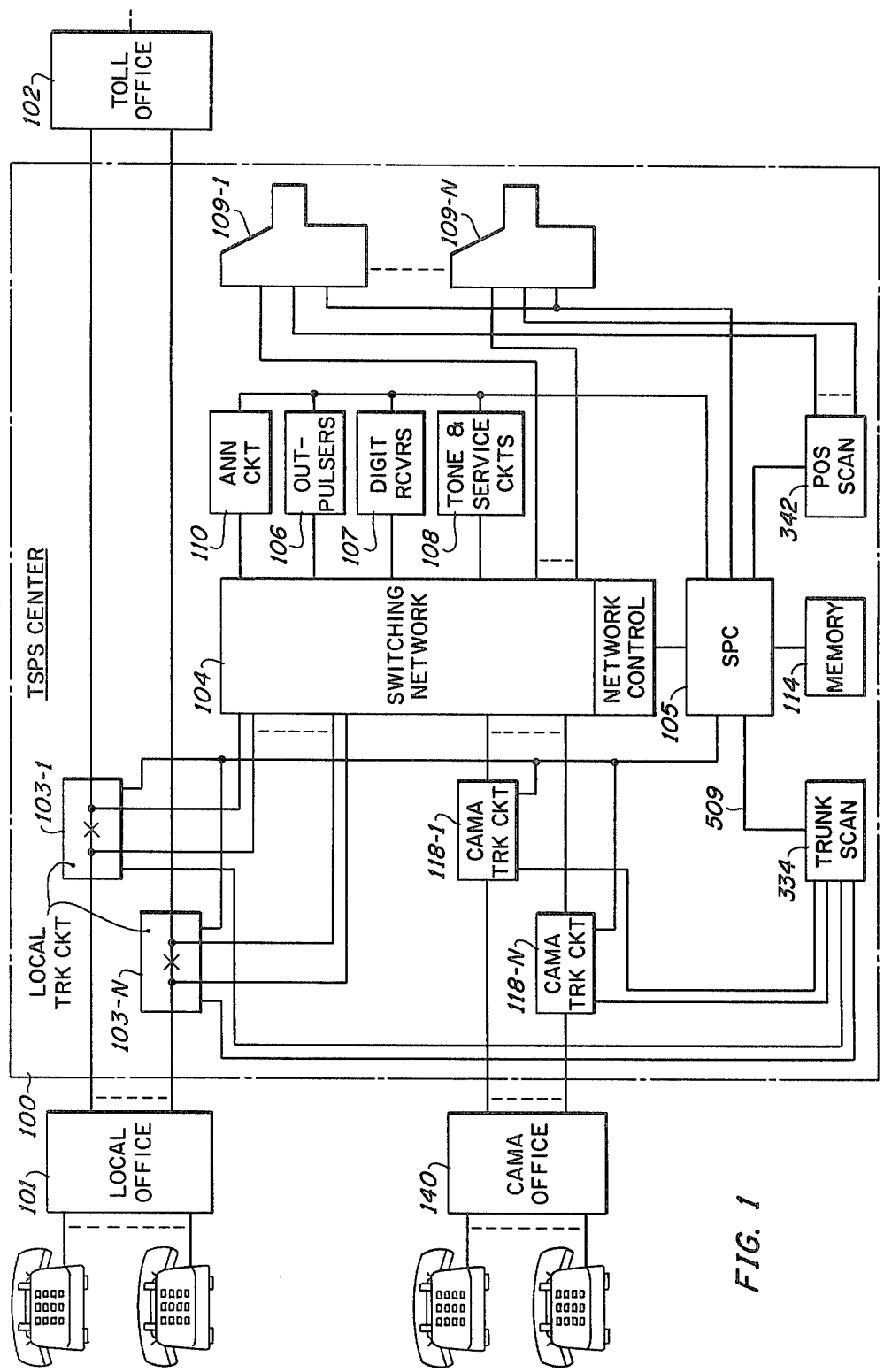
FIG. 1 is a general block diagram of a system employing the present invention.

The TSPS center 100 operates in response to signals from a Stored Program Controller (SPC) 105 which in turn operates in response to information stored in a memory circuit 114. Each trunk from the local telephone office 101 is connected to an associated local trunk circuit 103-1 through 103-n and each trunk from a CAMA office 140 is connected to an associated CAMA trunk circuit 118-1 through 118-n. Both the local and CAMA trunk circuits are connected to the switching network 104. A trunk scanner circuit 334 periodically determines if requests for service are present at any of the trunk circuits 103-1 through 103-n or 118-1 through 118-n and notifies SPC 105 when such requests are present. TSPS center 100 further comprises a position scanner circuit 342 which determines the availability of operator positions 109-1 through 109-n for providing service. Although not utilized in the present embodiment, a position scanning function can be performed by periodically checking registers in memory 114 indicative of the status of the positions thereby avoiding a scanning of the positions 109-1 through 109-n directly. The particular arrangement utilized for position scanning is not critical in the present invention. Generally, trunk scanner circuit 334 detects requests for service and notifies the SPC 105 which trunk is making the request. SPC 105, based on the information from the position scanner 342, then generates signals for controlling the system to connect the requesting trunk to an available one of the operator positions 109-1 through 109-n. From time to time, more requests for service occur than there are operator positions to serve them. When this happens, the subscriber requests are placed in a queue and served when the positions become available. The operation of the TSPS shown in FIG. 1 is described in detail in R. J. Jaeger, Jr., et al., U.S. Pat. No. 3,484,560, issued Dec. 16, 1969, and in *The Bell*

*System Technical Journal,* Volume 49, No. 10, December, 1970, pp. 2417 through 2729.

The only service provided to subscribers of the CAMA office 140 is that of receiving and recording the calling party's telephone number. Any operator service, e.g., person-to-person, collect, etc., can be provided to subscribers of the local office 101. Human factor studies and certain circuitry limitations suggest that a local office subscriber should be served within approximately sixty seconds and that a CAMA office subscriber should be served within approximately twenty seconds of the receipt by the TSPS center 100 of the requests from the subscriber. When the number of requests in the queue gets too large, it may be impossible to serve them within their service acceptability time. Accordingly, limits are placed on the number of subscribers allowed to queue while waiting for service. The present invention is a method of limiting the queuing subscribers and apparatus for performing the method when classes of subscribers have different service acceptability standards.

Figure 2:
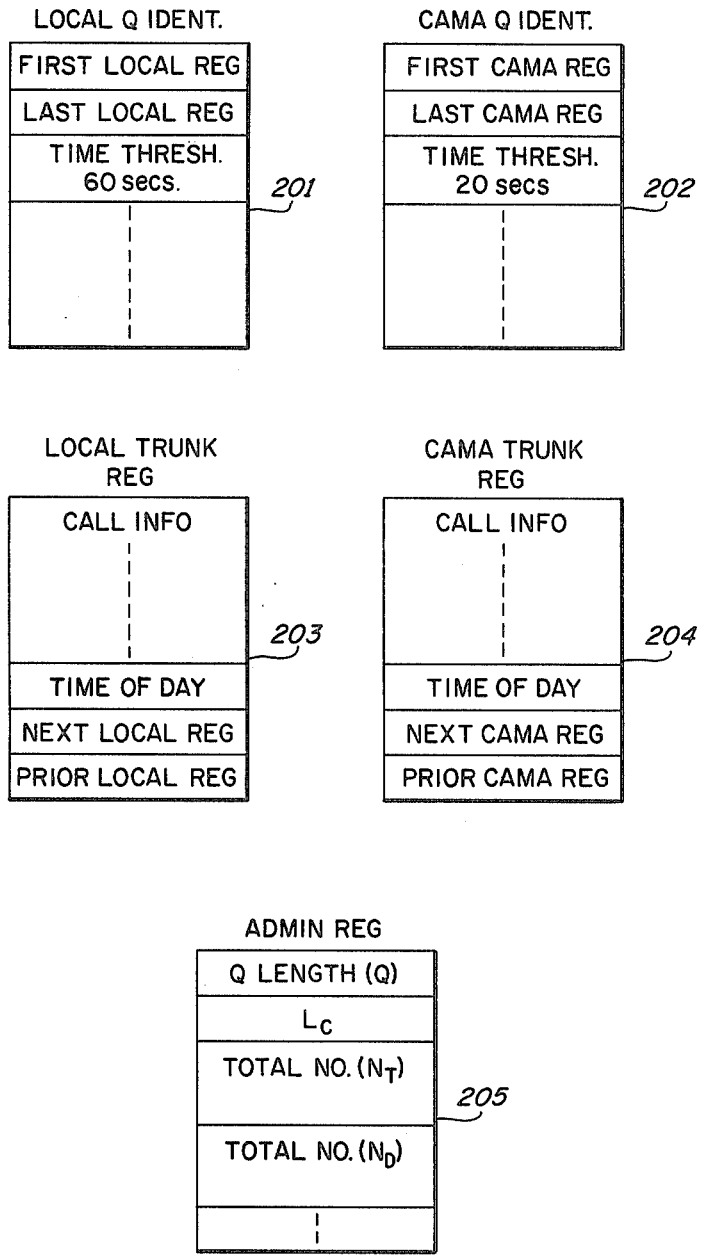
FIG. 2 is a drawing of certain control registers used in the present invention.

FIG. 2 represents certain registers employed in the present embodiment. These registers are comprised of storage areas in memory circuit 114, however, the exact location of these registers is immaterial to the invention. Two queues, called the local queue and the CAMA queue, are established in accordance with the present embodiment. The local queue is used to store local subscriber requests for service and the CAMA queue is used to store CAMA subscriber requests. Each queue is associated with a queue identity register shown in FIG. 2 as local queue identity register 201 and CAMA queue identity register 202. These registers contain information useful in controlling their associated queue of service requests. Each of the local trunk circuits 103-1 through 103-n is uniquely associated with a trunk register such as local trunk register 203 (FIG. 2) and each CAMA trunk circuit 118-1 through 118-n is uniquely associated with a CAMA register such as CAMA trunk register 204 (FIG. 2). A queue of service requests from subscribers of the local telephone office 101 comprises a sequence of bidirectionally linked local trunk registers. Each local trunk register in a queue accordingly stores the address of the immediately preceding local trunk register in the queue and the immediately subsequent local trunk register in the queue, if such a subsequent register exists. The local queue identity register 201 stores the identities of both the first and the last local trunk registers in its associated queue so that the local office queue can be located at any time. The CAMA queue is a bidirectionally linked list of CAMA trunk registers which can be identified by the addresses of the first and last CAMA registers stored by the CAMA queue identity register 202.

Figure 5:
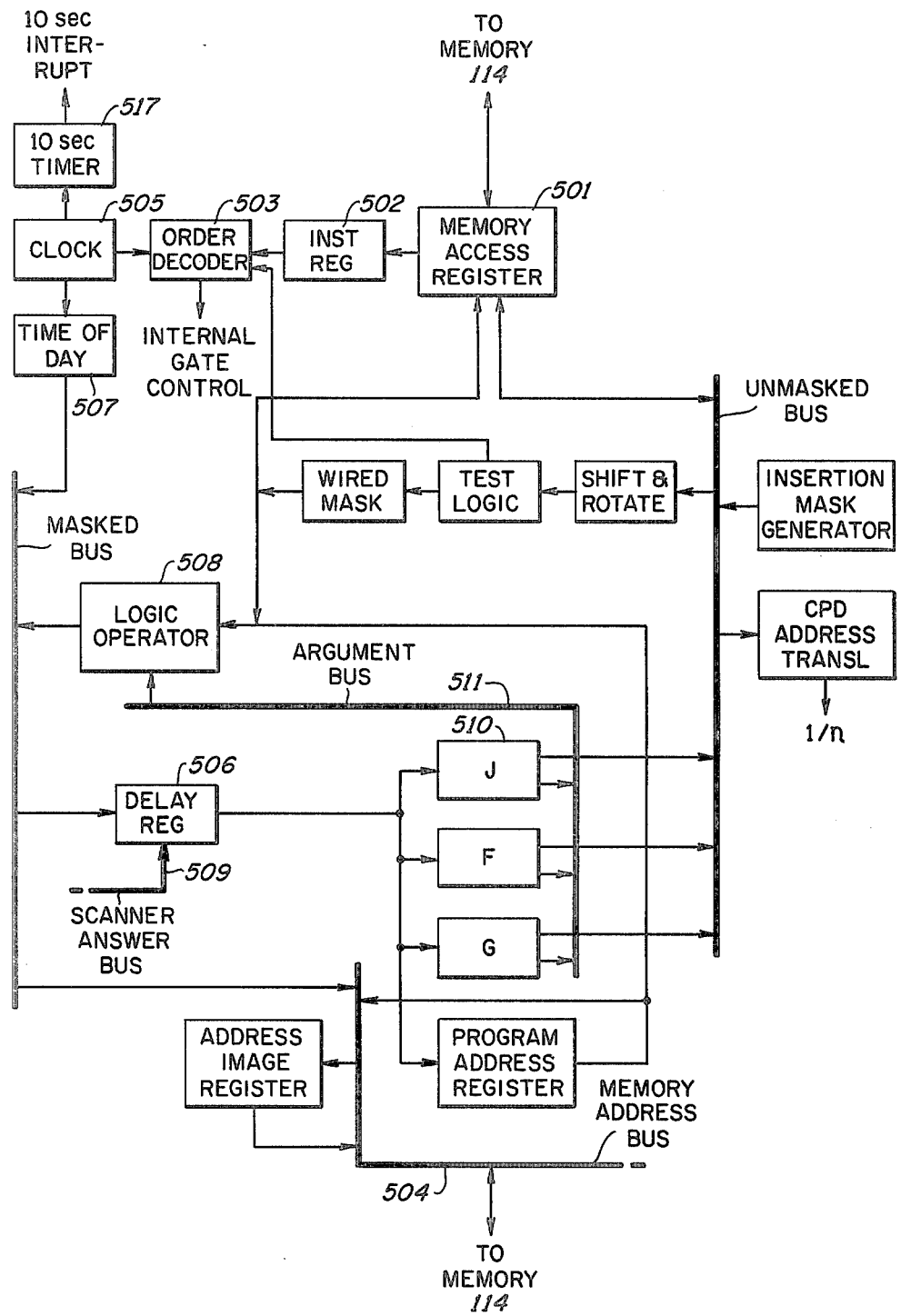
FIG. 5 is a block diagram of program controls utilized in the present invention.

FIG. 5 is a general block diagram of a portion of SPC 105. SPC 105 operates in response to information, including both instructions and data, obtained from a memory circuit 114 (FIG. 1). This information is obtained from memory circuit 114 in response to addresses transmitted on a memory address bus 504. Memory circuit 114 responses which can include both data and instructions are transmitted to a memory access register 501. Instructions received by memory access register 501 are transmitted to an order register 503 via an instruction register 502. These instructions are combined with timing signals from a clock circuit 505 to control the overall operation of SPC 105. Other information received by memory access register 501 can be gated to various registers and circuits included in SPC 105 as is described in detail in the afore-mentioned *The Bell System Technical Journal* article and Jaeger patent.

Signals representing new requests for service identified by the trunk scanner circuit 334 are transmitted via a scanner answer bus 509 to delay register 506. Based on the type of trunk circuit identified, i.e., CAMA or local, the associated identity register (CAMA queue identity register 202 or local queue identity register 201 [FIG. 2]) is read from memory circuit 114. For the following description, it is assumed that a CAMA subscriber request is to be placed in its associated queue. Accordingly, CAMA queue identity register 202 is read from memory circuit 114. The identity of the last CAMA register from CAMA queue identity register 202 is then written into the prior CAMA register portion of the CAMA trunk register, e.g., 204, associated with the requesting subscriber. Additionally, the identity of the new CAMA trunk register 204 is placed in the last CAMA register portion of CAMA queue identity register 202.

SPC 105 further includes a time-of-day counter 507 which, in response to clock pulses from clock circuit 505, generates signals called time-of-day signals defining present time. The time-of-day signals from time-of-day counter 507 are stored in each trunk register at the time that register is added to a queue to be used at a later time to determine the adequacy of service given the subscriber. The addition of local subscriber requests to the queue is substantially identical to that above described except that the local queue identity register 201 is utilized instead of CAMA queue identity register 202.

Figure 3:
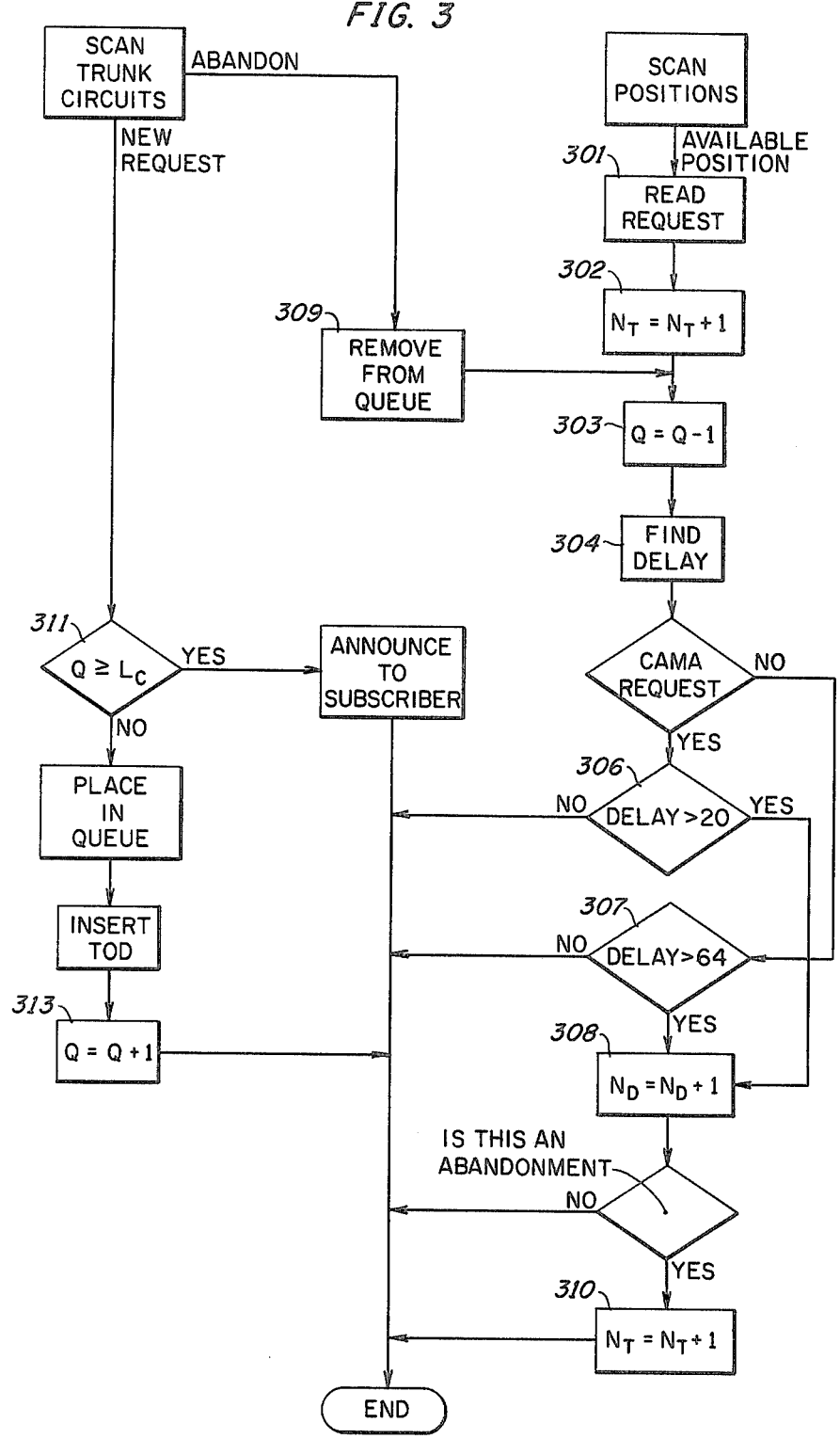
FIGS. 3 and 4 show sequences of operations used in operating the present invention.

FIG. 3 is a flow diagram showing the sequence of steps utilized in the present embodiment for administering the queues which are already in existence. Position scanner 342 periodically scans operator positions 109-1 through 109-n to determine if any are available to service requests for assistance. When an available position is discovered, position scanner 342 transmits the identity of that position to the SPC 105, which selects one queue either local or CAMA, from which the oldest request for service is to be taken. The particular queue selected is not material to the present invention. One method of queue selection, however, would be to alternate between the two queues. For the purposes of the following example, it is assumed that the CAMA queue identified by CAMA queue identity register 202 of FIG. 2 is selected to provide the service request. The oldest entry in this queue is identified by the first CAMA register portion of this register content. Based on this "oldest trunk" identity, SPC 105 controls the switching network 104 and the newly available position to connect and serve the subscriber. The CAMA trunk register associated with the "oldest trunk" is then read in a step 301 (FIG. 3) on the basis of the first CAMA register portion of the CAMA queue identity register 202.

Memory circuit 114 also includes a queue administration register 205 (FIG. 2) which is used by SPC 105 to administer queuing functions. Queue adminstration register 205 includes a current indication of the total queue length (Q), a critical value ($L_C$) to be discussed in greater detail later herein, a record of the number of service requests served by the system ($N_T$) and a record of the number of requests ($N_D$) which were not served within their associated service acceptability time. Variables $N_T$ and $N_D$ were utilized in making the decision to vary the critical Q length variable $L_C$. The variables $N_T$ and $N_D$ are occasionally reset to zero so that any decision is made only on the basis of current calling data. As will be described in greater detail later herein, $N_T$ and $N_D$ will generally be accumulated for a period less than sixty seconds before being reset to zero. Whenever a new request is forwarded from a queue to a position, the variable $N_T$ is incremented by one (step 302) and the queue length variable (Q) in queue administration register 205 is reduced by one (step 303, FIG. 3). A variable can be incremented and decremented by reading that variable from memory circuit 114 into memory access register 501 and gating it to a logic operator 508 where it is incremented or decremented as defined in a manner well known in the art. The variable is then returned under program control to the storage position of memory circuit 114 from which it was originally read.

The CAMA queue identity register also includes the time threshold (service acceptability time) which is to be utilized to determine if the subscriber was given acceptable serivce. The time threshold stored by CAMA queue identity register 202 is twenty seconds. If a CAMA subscriber is not served within twenty seconds, deficient service is given that subscriber. In order to determine overall delay (step 304), the time-of-day portion of the CAMA trunk register, which indicates the time the request was placed in the queue, is read from memory circuit 114 and subtracted in logic operator 508 from the present time of day obtained from the time-of-day counter 507. The result of this subtraction which represents the subscriber's delay in the queue can be placed in a general register 510. When, as in the present example, the subscriber being served is a CAMA subscriber, the delay value in general register 510 is compared with the CAMA time threshold of twenty seconds stored in the CAMA queue identity register 202. When the delay value in general register 510 is greater than twenty seconds, deficient service was given the subscriber. Alternatively, if the delay value is less than or equal to twenty seconds, adequate service was given to the subscriber.

The comparison of delay value and time threshold (step 306 or 307) can be performed by subtracting the time threshold from the delay value. If the result is non zero and positive, deficient service was given. On the other hand, if the result is zero or negative, adequate service was given. When it is determined that deficient service has been given to any subscriber, the variable $N_D$, which is a count of the total number of subscribers receiving deficient service is incremented by one (step 308). The sequence of operations then returns to the scan of trunk and/or position circuits as above described. Alternatively, if the CAMA subscriber is served within the twenty second time threshold, the variable $N_D$ is not incremented and the system again returns to the scan routine. When the request served is from the local trunk queue and not from the CAMA queue, the procedure is essentially the same as above described, however, the time threshold utilized is sixty seconds as obtained from the local queue identity register 201. If a local subscriber is forced to queue for more than sixty seconds, the service is considered deficient and the variable $N_D$ is incremented as in the case of deficient service to a CAMA subscriber. It should be noted that the variable Q for the queue length is total length of the local trunk and CAMA trunk queues. Further, the variable $N_D$ records all service deficiencies by counting all occurrences of deficient CAMA and local service.

FIG. 3 also shows the sequence of steps involved in scanning CAMA trunk circuits 118-1 through 118-n and local trunk circuits 103-1 through 103-n. When trunk scanner circuit 334 discovers that a subscriber has abandoned his request for service, the associated trunk register, either local or CAMA, is removed from its associated queue (step 309). The removal of items from a bidirectionally linked list is well-known in the art and will not be described in greater detail herein. After removal from the queue, the queue length variable Q is reduced by one in step 303 and a determination is made based on whether the subscriber was a CAMA or a local subscriber and whether the subscriber was given deficient service or not prior to his abandonment.

If the subscriber received deficient service, the variable $N_D$ is incremented in the step 308 and the variable $N_T$ is incremented in step 310. The variable $N_T$ is not incremented during the treatment of all abandonments, but only those abandonments which occur after deficient service. As will become apparent later herein, the variable $N_T$ is incremented in abandonment situations only to lessen slightly the effect of having given deficient service to customers who later abandon.

Scanning the trunk circuits may also yield a new request for service. Before a new request is added to the queue, the queue length variable Q is compared in a step 311 with the critical value $L_C$. The origin of $L_C$ is discussed in greater detail later herein. If the present queue length Q is greater than or equal to $L_C$ it is assumed that too great a delay will occur if the request is placed in the queue. Accordingly, SPC 105 connects the subscriber via the associated trunk circuit and switching network 104 to an announcement circuit 110. Announcement circuit 110 notifies the subscriber that he should try again at a later time. In situations where announcements are unavailable or undesirable, reorder or busy tones can be returned to the subscriber. If the queue length Q is less than the critical value $L_C$, the request is placed in the queue associated with its type of service, i.e., CAMA or local. Further, the present time of day is stored in each trunk register at the time it is placed in the queue, and the queue length variable is incremented by one in step 313.

The variable $L_C$ is used to eliminate excessive delay in the position queues by limiting the number of requests placed in those queues. As described above, whenever the addition of a new request for service to a queue causes the combined queue length Q to be greater than or equal to $L_C$, the new request is not placed in the queue. The value of $L_C$ is dynamically varied, dependent upon present traffic and service rates. The variation is permitted only between the boundaries shown in Table 1 for different numbers of occupied positions 109.

TABLE 1

| Occupied Positions | Upper Bound $L_{CUB}$ | Lower Bound $L_{CLB}$ |
|---|---|---|
| 1–5 | 17 | 6 |
| 6–10 | 34 | 9 |
| 11–15 | 53 | 13 |
| 16–20 | 72 | 15 |
| 21–25 | 90 | 18 |
| 26–30 | 109 | 23 |
| 31–35 | 128 | 28 |
| 36–40 | 146 | 32 |
| 41–45 | 165 | 37 |
| 46–50 | 184 | 41 |
| 51–60 | 221 | 50 |
| 61–70 | 258 | 59 |

TABLE 1-continued

| Occupied Positions | Upper Bound $L_{CUB}$ | Lower Bound $L_{CLB}$ |
|---|---|---|
| 71-80 | 296 | 68 |
| 81-90 | 333 | 77 |
| 91-100 | 370 | 88 |

Figure 4:
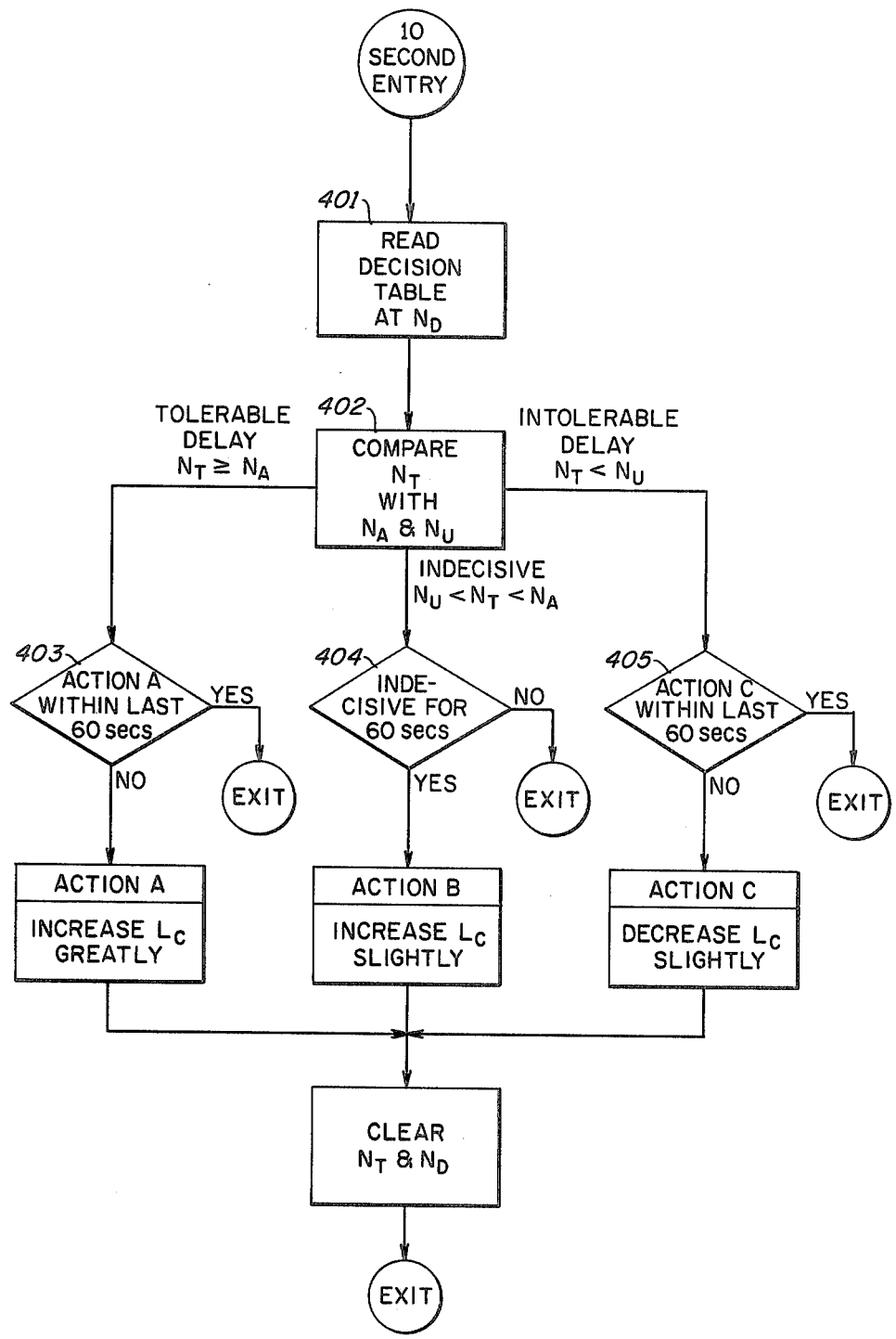

Initially, the value of the variable $L_C$ is set to equal the lower bound associated in Table 1 with the number of occupied positions. Every ten seconds, in response to signals from a ten-second timer 517 the SPC 105 initiates an action to determine whether corrections in the value of $L_C$ are desirable. The sequence of actions employed to modify $L_C$ is shown in FIG. 4. Such modifications are based in part on a decision table stored in memory circuit 114. Table 2 is a representation of this decision table.

TABLE 2

Decision Table For Sequential Sampling Test

| $N_D$ | $N_U$ | $N_A$ |
|---|---|---|
| 0 | 0 | 6 |
| 1 | 0 | 12 |
| 2 | 0 | 17 |
| 3 | 5 | 22 |
| 4 | 10 | 28 |
| 5 | 16 | 33 |
| 6 | 21 | 38 |
| 7 | 27 | 44 |
| 8 | 32 | 49 |
| 9 | 37 | 55 |
| 10 | 43 | 60 |
| 11 | 48 | 65 |
| 12 | 58 | 71 |
| 13 | 59 | 76 |
| 14 | 64 | 81 |
| 15 | 70 | 87 |
| 16 | 75 | 92 |
| 17 | 80 | 98 |
| 18 | 86 | 103 |
| 19 | 91 | 108 |
| 20 | 96 | 114 |

Each time the sequence of action shown in FIG. 4 is commenced a base address identifying the first entry of the decision table (Table 2) is read from a known location in memory circuit 114. The number of subscribers who have received deficient service ($N_D$) is then added to the base address to define a particular entry (row) of the decision table. The particular decision table entry defined by the sum of the base address and $N_D$ is then read from memory circuit 114. Each entry of the decision table consists of two numbers $N_U$ and $N_A$. In Table 2 the value of $N_A$ associated with any given $N_D$ has been selected such that if the total number of subscribers served ($N_T$) is greater than or equal to $N_A$ then tolerable overall service has been given. Further, when $N_T$ is less than the value of $N_U$ it is determined that unacceptable overall service has been given. Lastly, when $N_T$ is greater than or equal to $N_U$ but less than $N_A$ the result is considered inconclusive. In accordance with the above, the variable $N_T$ is compared with the values $N_U$ and $N_A$ accessed from Table 2 in a comparison step 402 (FIG. 4). Depending on the outcome of the comparison step 402, a flow path directed toward one of the actions A, B, or C is taken.

When the performance of step 402 indicates a tolerable delay has occurred ($N_T$ is greater than or equal to $N_A$), a step 403 is performed to determine if action A should be taken. When action A is taken, the variable $L_C$ is greatly increased. This action will be taken if the performance of step 403 indicates that action A has not been taken within sixty seconds. After the performance of action A the variables $N_T$ and $N_D$ are reset to zero. Action A is intended to increase the queue length to its maximum, if possible. Increasing $L_C$ to equal five-fourths $L_C+2$ has been found to yield satisfactory results for action A. When the performance of step 403 indicates action A has been taken within the last sixty seconds, the sequence of actions shown in FIG. 4 are terminated without resetting the variables $N_T$ and $N_D$ until the next ten-second entry.

When the performance of step 402 indicates that an intolerable delay has occurred ($N_T$ is less than $N_U$) a step 405 is performed to determine if action C should be taken. Action C is taken to slightly decrease the variable $L_C$ within the bounds shown in Table 1. Action C will be taken if it is determined in step 405 that action C has not been taken within the last sixty seconds. After performing the action C, the variables $N_T$ and $N_D$ are reset to zero. The reduction in $L_C$ occasioned by performing action C effectively reduces the time delay in the queue by reducing the number of new queue entries. Reducing $L_C$ to five-sixteenths $L_C-1$ has been found to satisfy these requirements. Although not specifically described herein, it has also been found desirable to keep a record of the maximum number of subscribers in the queue for sixty-second intervals and to make $L_C$ equal to fifteen-sixteenths of the value so recorded minus one as action C. It is not material to the present invention which of the above-noted actions C are actually employed. When the performance of step 405 indicates that action A has been taken within the last sixty seconds, the sequence of action shown in FIG. 4 is terminated without resetting $N_T$ and $N_D$ until the next ten-second entry.

When the performance of comparison step 402 yields indecisive results ($N_T$ is greater than $N_U$ but less than $N_A$), the flow proceeds to a step 404 where an additional decision is made to determine if action B should be taken. Action B consists of slightly increasing the variable $L_C$ to allow an increased queue length. Action B will be taken if the comparison performed in comparison step 402 has yielded indecisive results for sixty seconds. After the performance of action B, the variables $N_T$ and $N_D$ are reset to zero. If the performance of step 404 indicates that indecisive results have not occurred for the last sixty seconds, the sequence of action shown in FIG. 4 is terminated without resetting the variables $N_T$ and $N_D$.

Throughout the preceding discussion, the average number of service requests in the queue is reduced by selectively limiting the entry of new requests into the queue based on the comparison of the present length of the queue and a critical length variable $L_C$. It is also possible to reduce the number of requests in the queue by alerting the operators working at the positions 109-1 through 109-n that greater speed is required in providing service when the number of requests in the queue is greater than a dynamically adjusted variable similar to $L_C$. Accordingly, limiting new entries into the queue should not be considered the only method of reducing the number of service requests in the queue. Further, throughout the preceding description two classes of subscribers have been described, each having an associated service acceptability time. It is well within the scope of the present invention to construct a system having a greater number of classes of subscribers, each having an associated service acceptability time.

I claim:

1. In an arrangement for providing operator services to a plurality of subscribers in response to service requests which are accumulated in a queue before being served and where each service request is associated with one of a plurality of service acceptability times, the method of limiting the number of service requests in said queue comprising the steps of:
   A. serving the subscribers represented by said service requests in a predetermined order;
   B. counting the total number of subscribers to which operator services are provided;
   C. determining the elapsed time between entry of a service request into said queue and the time that service is given in response to that service request;
   D. determining when deficient service has been provided to a subscriber by comparing the elapsed time, determined in step C, with the service acceptability time associated with that service request;
   E. counting the total number of subscribers determined by the performance of step D to have received deficient service; and
   F. reducing the number of service requests in said queue when the number of subscribers receiving deficient service counted in step E exceeds a predetermined relationship to the total number of subscribers counted in step B.

2. The method in accordance with claim 1 further comprising the steps
   G. measuring the time elapsed since the last occurrence of step F; and
   H. resetting to zero the count maintained in steps B and E at the first to occur of either the performance of step F or the passage of a fixed interval of time since the last performance of the step F.

3. The method in accordance with claim 1 wherein step F further comprises the following step:
   I. inhibiting the entry of new service requests into said queue when the number of subscribers which received deficient service counted in step E exceeds a predetermined relationship to the total number of subscribers counted in step B.

4. The method of providing operator service to a plurality of subscribers in response to service requests where each service request is associated with one of a plurality of service acceptability times, comprising the steps of:
   A. receiving service requests from subscribers wherein each service request is uniquely associated with one of said subscribers;
   B. storing said service requests;
   C. reading said service requests stored in step B, in a predetermined order and providing service to the subscriber associated therewith;
   D. counting the total number of subscribers served in step C;
   E. determining the time elapsed between storage of each service request in step B and the provision in step C of service in response to that service request;
   F. determining when deficient service has been provided to a subscriber by comparing the time elapsed, determined in step E, with the particular one of said plurality of service acceptability times associated with each service request responded to;
   G. counting the number of subscribers determined by the performance of step F to have received deficient service; and
   H. reducing the number of service requests stored in step E when the count of subscribers receiving deficient service in step G, exceeds a predetermined relationship to the total number of subscribers counted in step D.

5. The method of providing operator services in accordance with claim 4 further comprising the steps
   I. counting the number of stored service requests and wherein step H further comprises
   J. selecting a predetermined critical length variable;
   K. decreasing the critical length variable when the count of subscribers receiving deficient service, in step G, exceeds a predetermined relationship to the total number of subscribers counted in step D;
   L. increasing said critical length variable when the count of subscribers receiving deficient service, in step G, is less than a predetermined relationship to the total number of subscribers counted in step D; and
   M. inhibiting storage of service requests of subscribers when the number of service requests counted in step I exceeds the critical length variable.

6. The method of providing operator services in accordance with claim 4 further comprising the steps:
   N. detecting when a subscriber has abandoned its request for service;
   O. determining the time elapsed between storage of each service request in step B and the abandonment of that request for service detected in step N;
   P. determining when deficient service has been provided to an abandoning subscriber by comparing the time elapsed determined in step O, with the particular one of said service acceptability times associated with each service request associated with an abandoning subscriber; and
   Q. reducing the number of service requests stored in step B when the total of the number of subscribers receiving deficient service in step G and the number of abandoning subscribers receiving deficient service determined in step P exceeds a predetermined relationship to the total number of subscribers counted in step D.

7. An arrangement responsive to service requests for providing operator services to a plurality of subscribers wherein each of said service requests is associated with one of a plurality of service acceptability times comprising:
   means for storing said service requests, each service request stored thereby including time of day signals indicating the time that the service request including said time of day signals was stored;
   means for serving the subscribers associated with service requests stored by said means for storing;
   means for generating service signals representative of the number of the subscribers served;
   means responsive to said time of day signals stored with said service requests for deriving delay signals indicative of the time between storage of each service request served and the servicing of that request;
   means for comparing said delay signals derived for each service request served and the service acceptability time associated with that service request;
   means for generating deficiency signals representing the total number of times that said delay signals exceed said service acceptability time; and
   means for limiting the number of service requests stored by said means for storing when the number represented by said deficienty signals exceeds a predetermined relationship with respect to the number represented by said service signals.

* * * * *

UNITED STATES PATENT AND TRADEMARK OFFICE
CERTIFICATE OF CORRECTION

PATENT NO. : 4,197,430

DATED : April 8, 1980

INVENTOR(S) : Douglas C. Dowden

It is certified that error appears in the above—identified patent and that said Letters Patent is hereby corrected as shown below:

In the claims, Column 9, claim 4, line 67, after "step" change "E" to read --B--.

Signed and Sealed this

Twenty-third Day of November 1982

[SEAL]

Attest:

GERALD J. MOSSINGHOFF

Attesting Officer     Commissioner of Patents and Trademarks